US006882162B2

United States Patent
Schirmer et al.

(10) Patent No.: US 6,882,162 B2
(45) Date of Patent: Apr. 19, 2005

(54) SYSTEM FOR THE WIRELESS TRANSMISSION OF INFORMATION AND/OR ENERGY BETWEEN A REMOVABLE VEHICLE SEAT AND THE VEHICLE BODY

(75) Inventors: Juergen Schirmer, Heidelberg (DE); Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 10/333,899

(22) PCT Filed: May 25, 2002

(86) PCT No.: PCT/DE02/01925

§ 371 (c)(1),
(2), (4) Date: Jan. 24, 2003

(87) PCT Pub. No.: WO02/096719

PCT Pub. Date: Dec. 5, 2002

(65) Prior Publication Data

US 2004/0008036 A1 Jan. 15, 2004

(30) Foreign Application Priority Data

May 30, 2001 (DE) .......................... 101 26 191

(51) Int. Cl.[7] ............................................. G01R 27/28
(52) U.S. Cl. ..................... 324/656; 324/645; 297/217.3
(58) Field of Search ................................ 324/654, 656, 324/691, 713; 296/65.03; 297/217.3; 307/10.1

(56) References Cited

U.S. PATENT DOCUMENTS

| 5,455,467 A | * | 10/1995 | Young et al. | ............... 307/104 |
| 5,696,409 A | * | 12/1997 | Handman et al. | .......... 307/10.1 |
| 5,969,409 A | | 10/1999 | Lin | .......................... 307/10.1 |

FOREIGN PATENT DOCUMENTS

| DE | 196 14 161 | 10/1996 |
| DE | 198 15 843 | 10/1998 |
| DE | 197 43 313 | 12/1998 |
| DE | 197 40 732 | 3/1999 |
| WO | WO 01 25056 | 4/2001 |

* cited by examiner

*Primary Examiner*—N. Le
*Assistant Examiner*—Timothy J. Dole
(74) *Attorney, Agent, or Firm*—Kenyon & kenyon

(57) ABSTRACT

A system for the wireless transmission of information and energy between a removable vehicle seat and the vehicle body, in which the vehicle seat is detected by measuring the inductance. In this connection, the period of an oscillating circuit is determined, in which the winding of the primary side, and thus the inductance, is connected. In this context, the frequency of the resonance voltage is determined as a function of time. In this context, the zero crossings of the resonance voltage is measured. Alternatively, the secondary side impedance is additionally measured on the primary side by a forced oscillation, namely by a voltage decay in a resonance circuit in which the winding is connected as inductance. A monitoring of the performance reliability of a firing pellet is thereby implemented.

6 Claims, 4 Drawing Sheets

SYSTEM FOR THE WIRELESS TRANSMISSION OF INFORMATION AND/OR ENERGY BETWEEN A REMOVABLE VEHICLE SEAT AND THE VEHICLE BODY

FIELD OF THE INVENTION

The present invention relates to a system for the wireless transmission of information or energy between a removable vehicle seat and the vehicle body.

BACKGROUND INFORMATION

It is conventional that one may use an inductive transformer for transmitting energy and/or information between the vehicle body and a removable vehicle seat. In a removable vehicle seat, there may be arranged an arrangement for restraint and sensor technology which have to be supplied with electrical energy and data. In addition, these electrical systems, and also data, are transmitted back to the vehicle body. In the case of the arrangement for restraint, these data may be diagnosis data. Such an inductive transformer has a primary side in the vehicle body and a secondary side in a removable seat. These inductive transformers may be configured rotationally symmetrical including ferromagnetic half-shells and coils wound on them.

German Patent Application No. 198 15 843 discusses a device for providing an electrical connection between parts of a vehicle. In this context, an interlocking mechanism is provided for mounting the vehicle seat on the vehicle. Antenna arrangement, such as a pair of coils, transmit an electrical power signal from the power source on the vehicle to at least one electrical device carried by the vehicle seat. Second antenna arrangement, such as a pair of antennas, transmit communications signals between the electrical device carried by the vehicle seat and the electrical control unit carried by the vehicle. A seat module for an arrangement for transportation is referred to in German Patent No. 197 43 313. The seat module includes a seat, a seat guide, at least one electrical consumer installed in the seat and an electrical connection between the electrical consumer and an external control unit outside the seat for transmitting energy and information. The electrical connection includes a transformer including two windings. The primary winding of the transformer is attached to the seat guide, and a secondary winding of the transformer is connected to the seat.

SUMMARY OF THE INVENTION

An example system according to the present invention for wireless transfer of information and/or energy between a removable vehicle seat and the vehicle body, may provide that, due to a measurement of the change in the inductance which comes about in response to a vehicle seat's installation or removal, the vehicle seat or the fact that the seat is not present are detected. Thereby the change in inductance between an installed and removed seat is used as an indication for the vehicle seat.

The inductance may be measured using an oscillating circuit in which the frequency of the decaying oscillation is used for calculating the inductance, since the other elements of the oscillating circuit, i.e., the capacitance, are known, the capacitor of the oscillating circuit being at first charged and supplying the energy for the oscillations. Using the generally conventional Thomson (oscillation) formula, one may then calculate the inductance. The inductance is then further evaluated electronically, if necessary, with the assistance of a processor. In this manner, the inductance of the winding on the primary side is measured. By the coupling of the primary side with the secondary side, a different inductance will be measurable on the primary side between the installed and the removed vehicle seat. To ascertain the period of the voltage in the oscillating circuit, a comparator may be used, whose output signal is then fed to a counter.

For measuring the impedance on the secondary side, on the primary side, in the installed state, a system including a generator, a resistor and a capacitor may be connected in series with the winding of the primary side, in order then to determine the impedance on the secondary side and the real part of this impedance, via the voltage which is decaying over the resistor or the capacitor. This makes possible checking the performance reliability of the firing circuit, and thus of the firing pellet, since the firing pellet in the switching circuit is arranged on the secondary side. Since here an oscillation is superimposed by the generator, the resonance curve of the oscillating circuit is changed by the changed impedance in the oscillating circuit, which includes the resistance of the capacitor and the inductance of the winding as well as the transformed impedance on the secondary side. This change in the resonance curve also leads to a changed voltage, which decays across the resistor or the capacitor. That is how one may then determine the impedance on the secondary side. For this too, a comparator is used for detecting a change in the voltage.

Exemplary embodiments of the present invention are shown in the drawings and are explained in the following description.

DETAILED DESCRIPTION

Vans and offroad vehicles including removable vehicle seats are becoming increasingly popular. Since electronic technology, and electrical technology such as an arrangement for restraint, are built into the vehicle seats, it is necessary to have data transmission and energy transmission between the devices that are in the seat and the other electronic systems in the vehicle body. For this transmission of energy and data, an inductive transformer is used. The primary side of the transformer is arranged on the vehicle body, in this context, and the secondary side is on the respective seat. According to the example embodiment of the present invention, an inductance change on the primary side of the transformer is used to determine whether the vehicle seat is installed or not. In one refinement, it is provided that, in the installed state, the impedance of the secondary side circuit, transformed to the primary side, is used for checking the performance reliability of the firing pellet arranged on the secondary side or other arrangement for firing.

Figure 1:
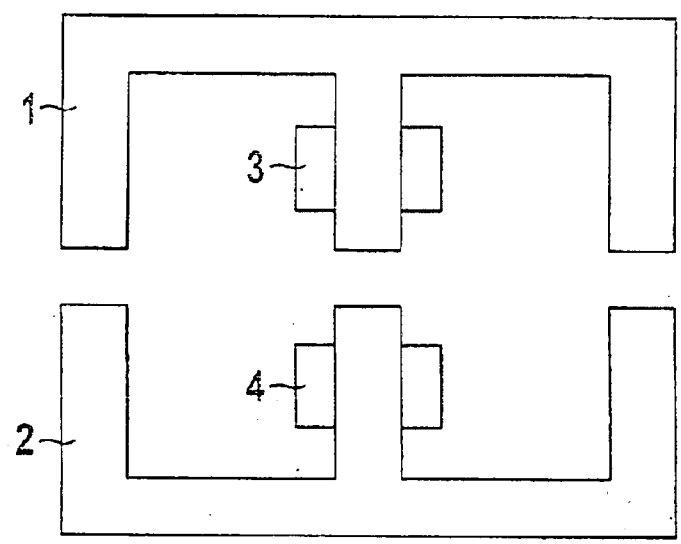
FIG. 1 shows an inductive transformer made up of two half-shells.

FIG. 1 shows an inductive transformer which includes a primary side 1 including a winding 3 and a secondary side 2 including a winding 4. In the installed state, half-shells 1 and 2 or core halves are built up flush to each other. Due to the inductive coupling of half-shells 1 and 2, an inductance is measurable at winding 3 that is different from when core half 2 is not present.

Figure 2:
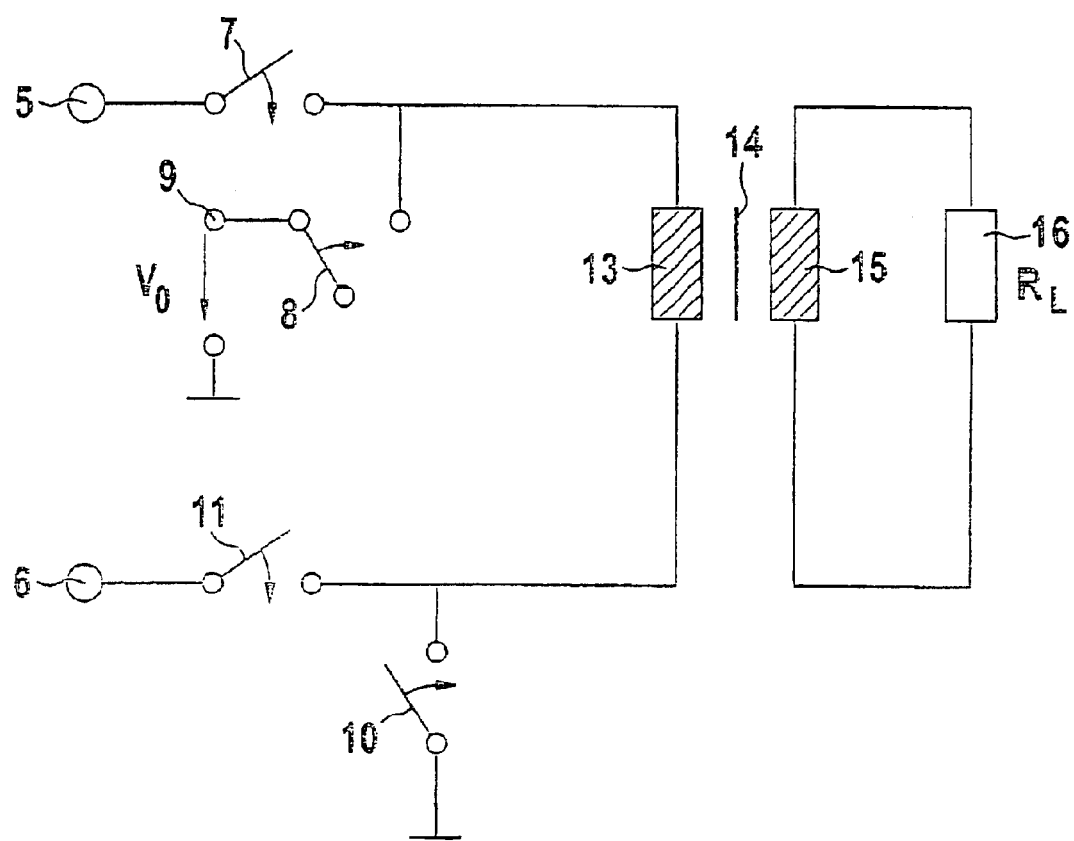
FIG. 2 shows a first switching system according to the present invention.

FIG. 2 shows a first switching system for evaluating the inductance at the primary side winding or coil. Via electrodes 5 and 6, the energy and the data are fed in, which are transmitted via a winding 13, an iron core 14, which includes the two core halves 1 and 2, and a winding 15 to the electrical system in the vehicle seat, when a load resistance RL 16 is connected to it. However, immediately after electrode 5 there is a switch 7, which is closed when energy and data are being transmitted. The same is true for a switch 11 which is connected to electrode 6, and which is followed by winding 13. A switch 8 is connected via a branching to switch 7 and winding 13. This switch 8 connects either the branching or a voltage V0 via an electrode 9 to a capacitor 12 which is connected to ground. Voltage Vc is measured via capacitor 12. During normal operation, switch 8 is set so that voltage V0 connects to capacitor 12.

Via a further branching, coming off the line between switch 11 and winding 13, a switch 10 is connected to ground. During normal operation switch 10 is open, and it is closed during the measurement of the inductance. Furthermore, during the measurement of the inductance, switches 7 and 11 are open, and switch 8 connects winding 13 to capacitor 12. Since capacitor 12 was loaded to voltage V0, this voltage now slowly decays in the oscillating circuit, which is made up of capacitor 12 and winding 13. This occurs in sinusoidal oscillations having a frequency f which may be calculated from the capacitance of capacitor 12 and the inductance of winding 13. The Thomson (oscillation) formula is used for this:

$$f = \frac{1}{2 \cdot \pi \sqrt{LC}}$$

From this formula, by transformation, the inductance is calculated using the capacitance of capacitor 12 and measured frequency f.

Figure 3:
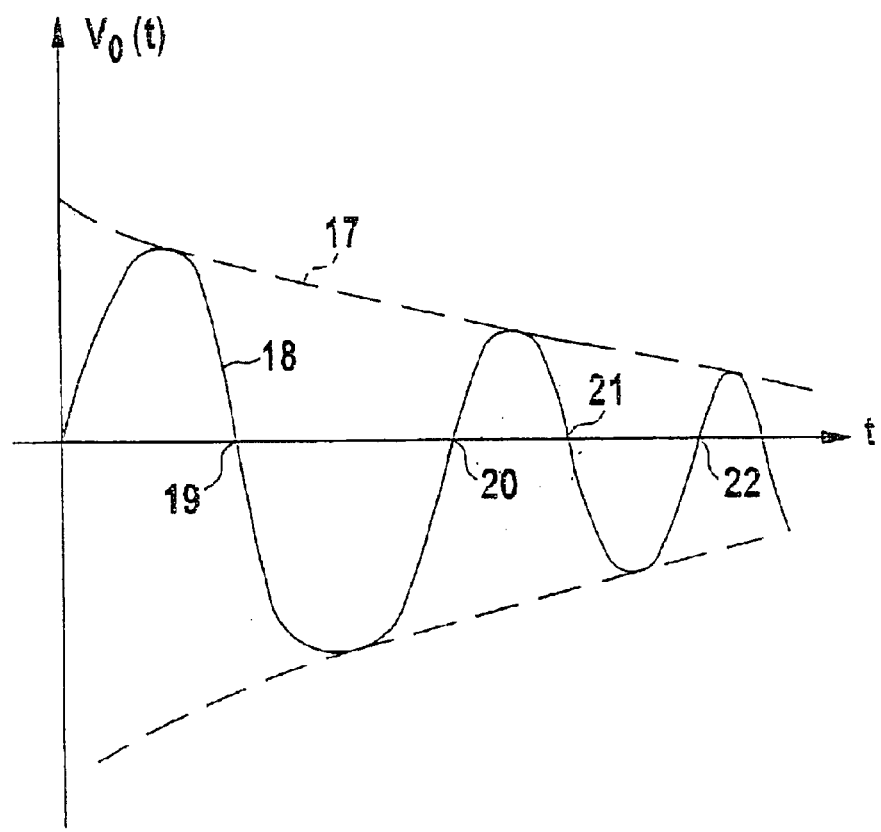
FIG. 3 shows a voltage-time graph.

FIG. 3 shows the decay of the capacitor voltage Vc as a function of time, in a voltage-time graph. Capacitor voltage 18 here decays in sinusoidal oscillations, since a resonance circuit is involved. Curve 17, which is present symmetrically to the time axis, shows the decaying behavior of curve 18. By measuring the zero-point crossings 19, 20, 21 and 22, the period and thus the frequency of the sinusoidal oscillation may be determined. Curve 17 is described by the following equation:

$$V(t) = \frac{V_0}{\omega \cdot LC} e^{\frac{R}{2LC} \cdot t}$$

The inductance may also be determined from the amplitudes of the decaying sine curve. However, that is more difficult than measuring the zero-point crossings.

Figure 4:
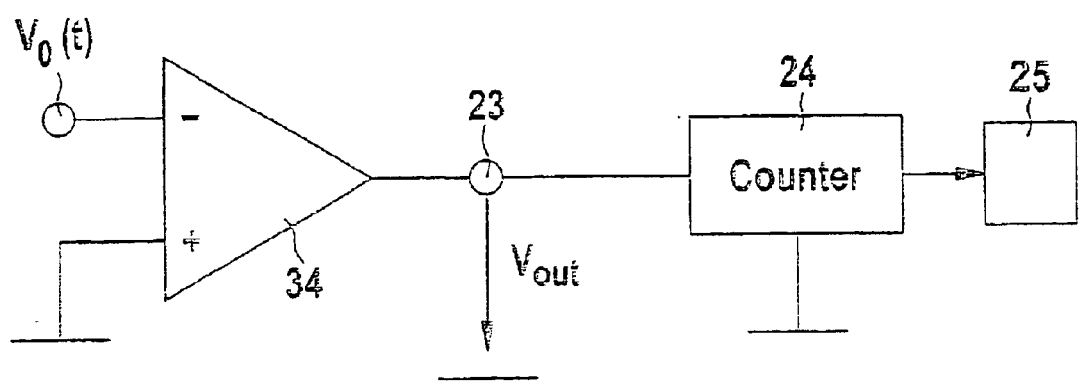
FIG. 4 shows an evaluation circuit for the voltage across the capacitor.

FIG. 4 shows such an evaluation circuit for measuring the zero-point crossings. Voltage Vc, which decays across capacitor 12, is compared by a comparator 34 to ground. Depending on whether voltage Vc is greater or less than 0, comparator 34 emits an output signal Vout at electrode 23. That makes it possible to generate a square-wave signal which is counted by counter 24. From this counting result, a connected processor 25 may then determine the period or frequency of sinusoidal oscillation 18. The inductance of winding 13 may then be determined from the stored value of the capacitance of capacitor 12 and the calculated frequency of voltage 18. This inductance is then compared to a stored threshold value, in order to determine whether the removable vehicle seat has been taken out or reinstalled. This will then be transmitted, for instance, to an air bag control unit, which no longer takes into consideration the arrangement for restraint in the removed seat.

This inductance measurement may be made periodically, by the respective switches being closed or opened.

Figure 5:
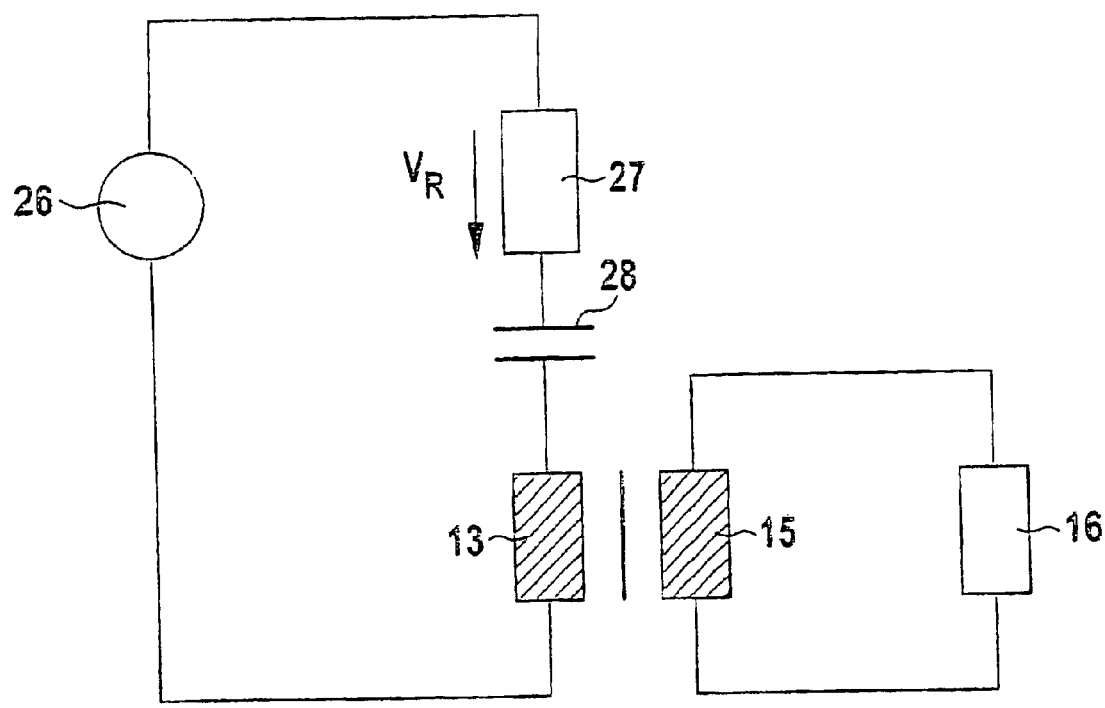
FIG. 5 shows a second switching system according to the present invention.

FIG. 5 shows a second circuit diagram of the system according to the present invention, which is used for the determination of impedance on the secondary side that has been transformed to the primary side. This makes necessary checking the performance reliability of the firing circuit, and in this context especially the firing arrangement, that is, the firing pellet. A generator 26 is connected to a resistor 27, which, in turn, on its other side is connected to a capacitor 28. Capacitor 28 is connected to winding 13 which, in turn, is connected to generator 26. The supply lines to the energy and data sources have been omitted. Winding 13, in turn, is magnetically coupled to winding 15 on the secondary side, via the iron core. Load resistor 16, which represents the firing arrangement, and here the firing pellet, is arranged on the secondary side. Generator 26 now impresses a sinusoidal oscillation upon the resonance circuit, which is made up of resistor 27, capacitor 28 and winding 13. This resonance circuit has a maximum at the resonance frequency, since here the real part of the voltage is maximally real across resistance 27 or capacitor 28. Only the voltage across resistor 27 Vr is examined in the following text.

Figure 6:
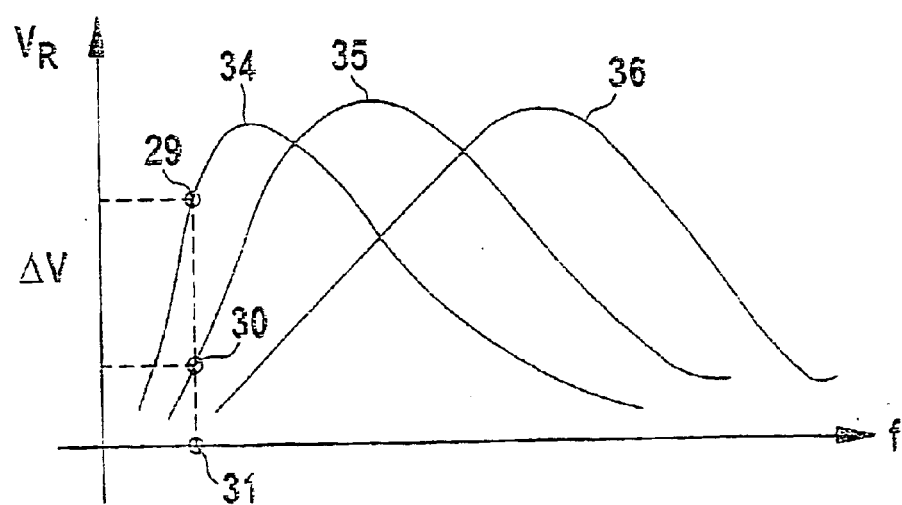
FIG. 6 shows a voltage-frequency graph.

FIG. 6 shows a voltage-frequency graph for voltage Vr. In this graph three resonance curves 34, 35 and 36 are drawn in, which apply to different load resistors 16. At a predefined value for resistor 16 we are on curve 34, and at a value deviating from that, we are, for example, on curve 35. Since the measurement is performed at one frequency 31 of generator 26, it may be seen that, at this frequency 31, points 29 on curve 34 and 30 on curve 35 are contacted. Between these two, a voltage difference ΔV is to be measured. Using this voltage difference, which corresponds to the change in resistance, it is possible to differentiate between a functioning firing pellet and a probably non-functioning firing pellet.

Figure 7:
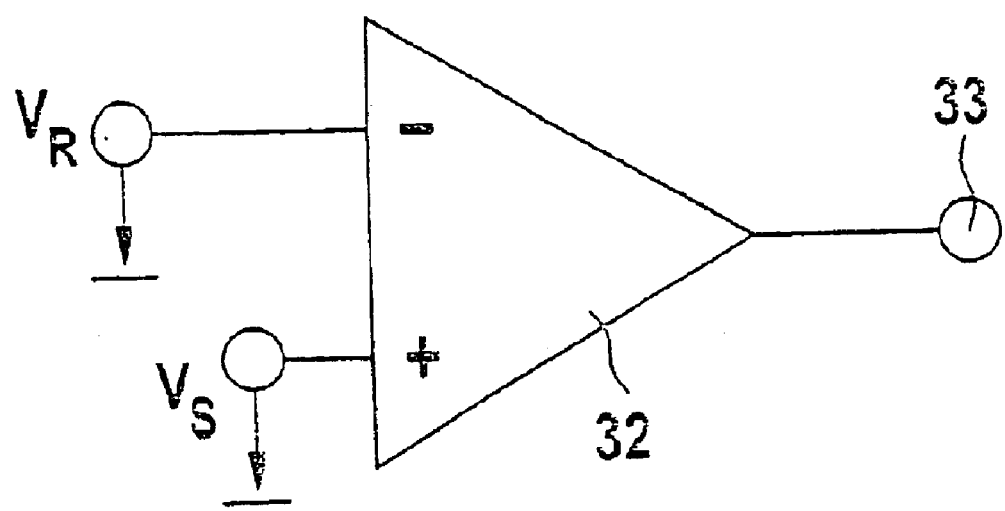
FIG. 7 shows an evaluation circuit for the voltage across the resistor.

For this again, as shown in FIG. 7, a comparator 32 is used, on which the voltage Vr is compared to a reference voltage Vs. Comparator 32 emits an output signal 33 depending on the comparison. This output signal, in turn, may be counted or digitized and evaluated by processor 25. Processor 25 then determines whether firing pellet 16 is in order or not. Depending on that determination, the energy supply and the data supply to the transformer, which is made up of half-shells 1 and 3, may be switched off.

This system for determining impedance is used in combination with the circuit for monitoring the inductance.

What is claimed is:

1. A system for wireless transmission of at least one of information and energy between a removable vehicle seat and a vehicle body, comprising:

an inductive transformer including a primary side in the vehicle body and a secondary side in the removable vehicle seat, the inductive transformer configured to transmit information and energy;

an arrangement on the primary side configured to measure an inductance of the inductive transformer to detect the removable vehicle seat; and a second arrangement on the primary side that is configured to determine an impedance on the secondary side.

2. The system of claim 1, wherein the second arrangement measures an impedance of a firing circuit and includes a generator, a resistor and a capacitor, the resistor and the capacitor being connected in series with a winding of the primary side; and a second voltage across one of the resistor and the capacitor is used as a measure for the impedance of the firing circuit.

3. The system of claim 2, further comprising:

a comparator that compares the second voltage with a reference voltage.

4. A system for wireless transmission of at least one of information and energy between a removable vehicle seat and a vehicle body, comprising:

an inductive transformer including a primary side in the vehicle body and a secondary side in the removable vehicle seat, the inductive transformer configured to transmit information and energy; and an arrangement on the primary side configured to measure an inductance of the inductive transformer to detect the removable vehicle seat, wherein the arrangement, at a winding on the primary side, includes a switch that is periodically closed so as to connect a loaded capacitor in series with the winding, a first voltage being measured across the loaded capacitor in response to closing the switch as a function of time in order to determine therefrom an inductance of the winding.

5. The system of claim 4, further comprising:

a second arrangement configured to count zero crossings of the first voltage in order to ascertain a period of the first voltage, and the inductance of the winding therefrom, the inductance being compared to a threshold value to detect the removable vehicle seat.

6. The system of claim 4, wherein the second arrangement includes at least one comparator.

* * * * *